Jan. 4, 1944. R. W. AUXIER 2,338,480
BEARING MATERIAL AND BEARING
Filed June 28, 1940 2 Sheets-Sheet 1
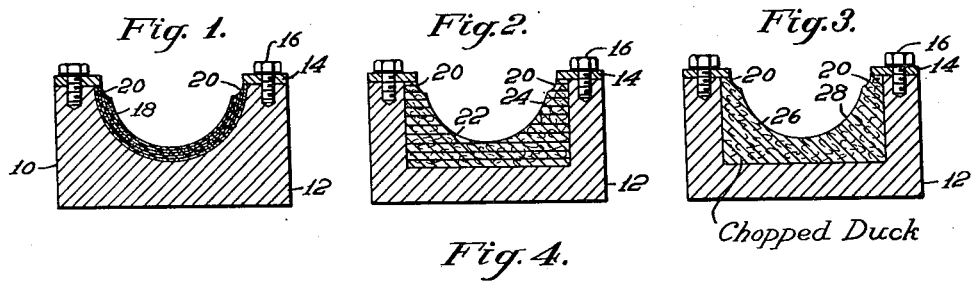
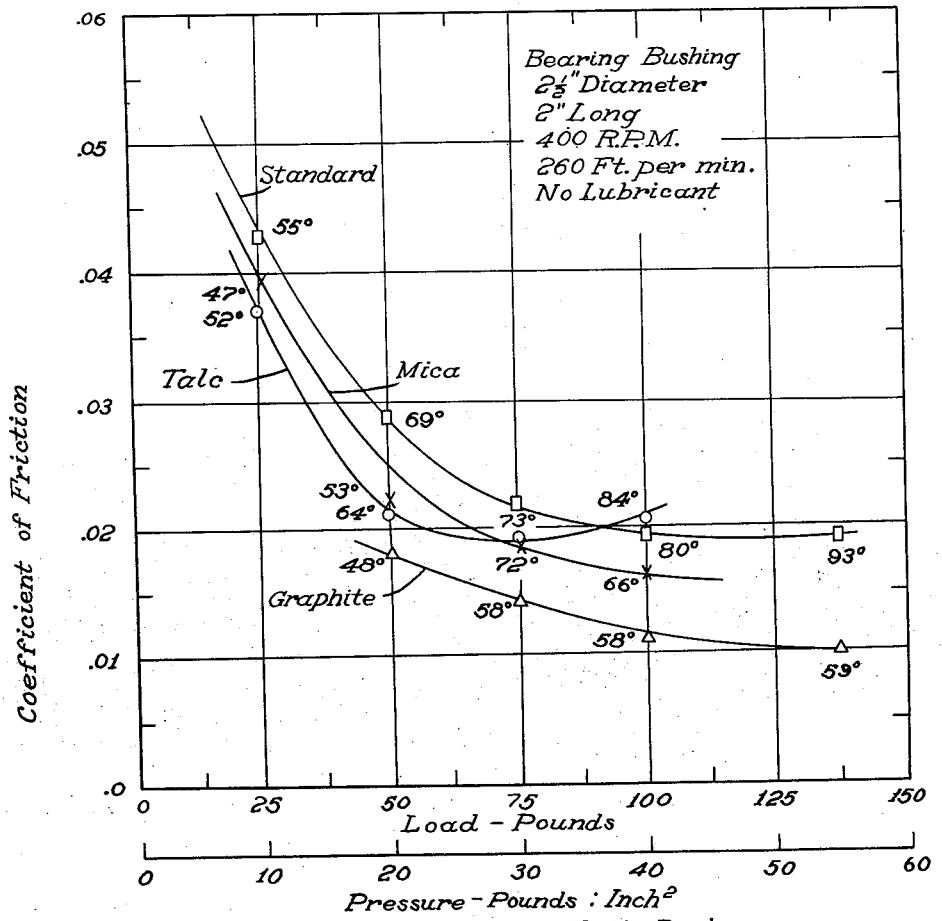
Influence of Additions to Synthetic Resin
Bearing Materials Upon the Value of
the Coefficient of Friction
WITNESSES:
INVENTOR
Robert W. Auxier.
BY
ATTORNEY

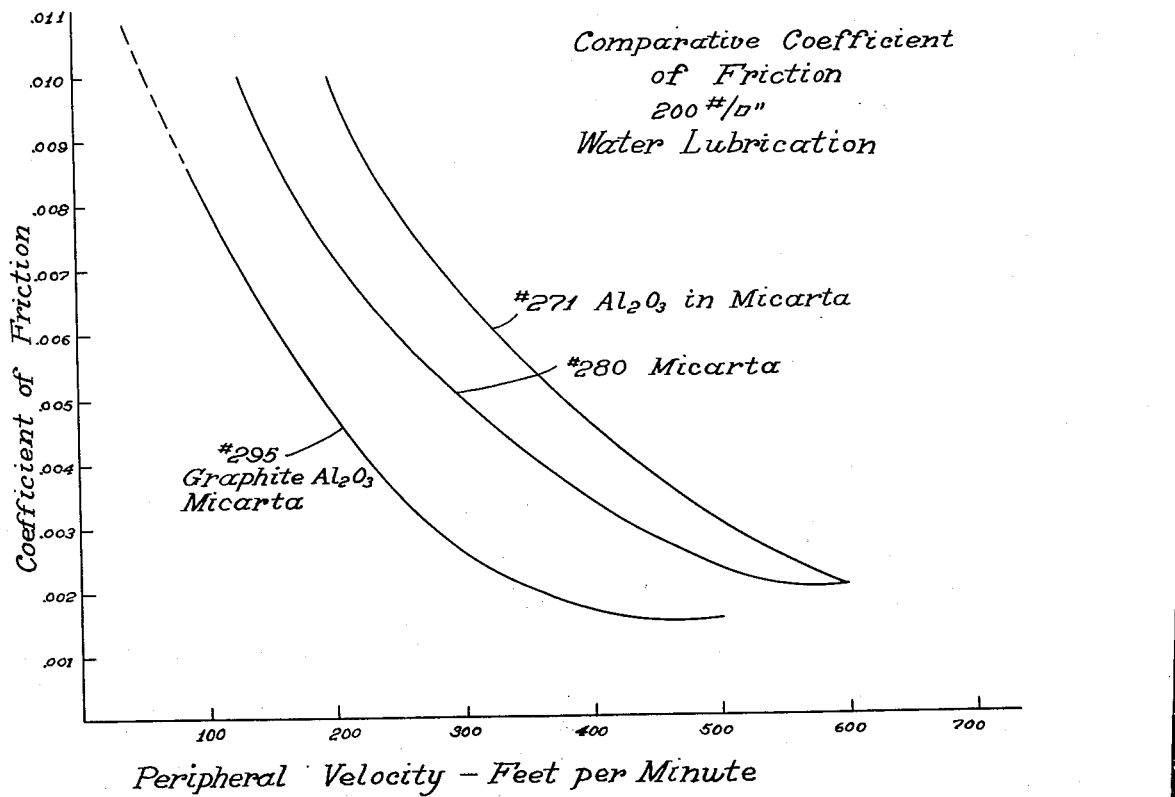

Patented Jan. 4, 1944

2,338,480

UNITED STATES PATENT OFFICE 2,338,480

BEARING MATERIAL AND BEARING

Robert W. Auxier, Forest Hills, Pa., assignor to Westinghouse Electric & Manufacturing Company, East Pittsburgh, Pa., a corporation of Pennsylvania Application June 28, 1940, Serial No. 342,933

13 Claims. (Cl. 308—238)

The invention relates, generally, to bearing materials and bearings, and more particularly, to composition bearing materials and bearings.

It has been proposed heretofore to introduce graphite into resinous compositions in order to decrease the coefficient of friction when the composition is used as a bearing. However, the addition of graphite to the compositions has been generally unsatisfactory. It has been difficult to secure a satisfactory dispersion of the graphite in the composition, in fact the product has been characterized by an uneven and flocculated scattering of the graphite. The bond strength of the composition bearings has decreased up to 50% by admixing graphite. Laminated composition bearings have delaminated and split much more readily when graphite was added. Furthermore the addition of graphite increased the rate of wear of the resinous composition bearing.

The object of the invention is to provide for embodying graphite in a composition bearing while maintaining predetermined bond strength.

A further object of this invention is to provide for embodying graphite in a composition bearing material in order to lower the coefficient of friction while maintaining predetermined bond strength and predetermined rate of wear.

Other objects of the invention will, in part, be obvious and will, in part, appear hereinafter.

For a better understanding of the nature and objects of the invention, reference may be had to the following detailed description taken in conjunction with the accompanying drawings, in which:

Figure 1 is a view in section of a bearing made in accordance with the teaching of this invention;

Fig. 2 is a view in section of a modified bearing;

Fig. 3 is also a view in section of a modified bearing;

Fig. 4 is a graph showing the coefficient of friction plotted against bearing pressure for different types of composition bearings; and Fig. 5 is a graph showing the coefficient of friction plotted against peripheral speed for Micarta bearings.

In a number of industries, composition bearings have been accepted because they have given longer life than the standard metal bearings previously employed. In the steel industry it has been found that composition bearings, such as Micarta bearings, have stood up satisfactorily for the rolling of 40,000 tons to 70,000 tons of steel and higher, as compared to about 900 tons of steel for metal bearings.

There are instances of rolling mills equipped with metal bearings, which have been shut down due to insufficient power, that have been operated successfully by the same prime mover when Micarta bearings were substituted for the metal bearings. These composition bearings have stood up very satisfactorily under severe operating conditions, and without receiving much servicing.

Composition bearings are normally lubricated and cooled with water, alone, or water containing a small proportion of oil as an emulsion. Therefore, the lubrication problem is not a difficult or expensive one.

"Micarta" is a trade name and is employed in this specification to designate a composition of matter comprising a fibrous base impregnated with a resinous binder, such as a phenolic, urea, or any of the other resins or resinous mixtures, all well known to the trade, manufactured and sold by the Westinghouse Electric & Manufacturing Company.

It is preferred to employ thermo-setting or heat-hardening resinous condensates as the resinous binder in manufacturing composition bearings. Typical thermo-setting resins which have been used satisfactorily for this purpose are the phenol-aldehyde, urea-aldehyde and certain of the alkyd type resins.

Composition bearings, such as Micarta bearings, have been manufactured from a base material such as duck or other fabric impregnated with a resinous binder carrying a suitable mineral. The addition of the mineral increases the life of the bearing for certain applications. The patent to Horne, et al., No. 2,162,890, has disclosed that certain minerals decrease wear and give a long bearing life under many operating conditions.

Composition bearings are employed effectively when the peripheral speed of the shaft is about 60 feet per minute or higher. It has been found that the coefficient of friction of composition bearings increases rapidly as the peripheral speed of the shaft at the bearing surface decreases, and about 60 feet per minute peripheral speed appears to be the lowest speed at which composition bearings could be used. Below this speed the composition bearings heretofore produced lost their advantages over other types of bearings.

In slow speed rolls, such as are employed in the roughing stands of steel mills with peripheral bearing velocities of less than 60 feet per minute, and in sugar cane mills where peripheral velocity bearing speeds of 13 feet per minute are prevalent, the coefficient of friction of the Micarta bearings, both with mineral and without, is exceedingly high.

A further characteristic of ordinary composition bearings is that they have a high static coefficient of friction. This demands a high starting torque to set slow speed-heavy duty service rolls and shafts into motion. In addition, due to the fact that water is employed as a lubricant on heavy steel trunnions, rusting may occur even during short shut-downs, and the coefficient of friction is increased to such an extent that extreme difficulty is had in starting slow speed, heavy duty roll equipment. In some cases the starting torque required is so large that the equipment can be set in motion only with the greatest effort.

A further difficulty prevalent in some of the prior art composition bearings arises due to the fact that the thermal conductivity of the composition is much less than that of metal bearings. Heat generated by friction in composition bearings results in high temperatures at the bearing surfaces for this reason. The composition employed in composition bearings ordinarily cannot withstand temperatures above 150° C. for any length of time. The bearings may seize at such temperatures. It is preferred, in fact, to keep the bearing temperatures below 100° C., if possible.

Composition bearings embodying graphite have a thermal conductivity two or three times that of the same composition without graphite. Accordingly, the graphitized bearing will run at lower temperatures for the same load and speed conditions and the tendency to seize will be much less.

It is a purpose of my invention to introduce graphite into bearing compositions to effectively reduce the coefficient of friction such that the bearings may be used in slow speed, heavy load service with satisfactory bearing wear and strength.

For the purpose of this invention, graphite powder of a lubricating grade is employed. The graphite powder for the purpose of incorporation into composition bearings should be 300 mesh, or finer. According to my invention, there are two methods of embodying the graphite in the Micarta bearing. It may be applied directly upon the fabric or fibrous base material and thereafter the base material carrying the graphite is coated or impregnated with resin and then the whole is consolidated under heat and pressure. Alternatively, the graphite may be incorporated into the resin and the fabric impregnated with the resin carrying graphite.

In order to secure a good distribution and adhesion of graphite in Micarta and other resinous compositions, it has been found that for this purpose a dispersing agent is required to effect the necessary uniform and deflocculated dispersion of graphite.

Dispersion agents have been defined as materials which deflocculate loose combinations of particles in a liquid medium. Under the action of a small quantity of a dispersing agent, loosely aggregated particles become completely independent of each other. The dispersing agent suitable for deflocculating any given material in a given liquid medium is more or less highly specific and will not, as a rule, deflocculate other substances. A dispersing agent is a chemical having a specific molecular structure by which the deflocculating effect is believed to be carried out.

The most satisfactory dispersing agent which has been discovered for deflocculating graphite in water is diglycol stearate. As little as 40 grams of diglycol stearate in 1000 grams of water will thoroughly disperse about 65 grams of 300 mesh graphite. A very stable and uniform suspension is obtained. The graphite does not tend to settle out rapidly enough to interfere with a uniform treatment of the fabric base with such a medium.

In addition to a dispersing agent, in order to obtain the best distribution and adhesion of the graphite onto the base material, it has been found that it is desirable to incorporate a wetting agent into the suspension of graphite.

A wetting agent is a water soluble material which in small quantities will materially reduce its surface tension and promote wetting. The effect of a wetting agent is directly upon the water itself, and does not depend upon any agglomeration or dispersion of particles which behave as if nothing had been added to the water. Wetting agents are not specific to the material being suspended in the liquid and, accordingly, numerous substances may be employed for this purpose.

Certain wetting agents have been found to be more conducive to a better distribution of graphite on the fabric base material than others. Two materials which have been productive of satisfactory results are sulphonated ester of a dicarboxylic acid sold under the trade name of Aerosol AY, and a sodium alkyl naphthalene sulphonate sold under the trade name of Alkanol. Two further products whose compositions are not known, but which are commonly sold to the trade for the purpose of acting as wetting agents, and which are quite satisfactory in the present application, are Erkalin and Product BC.

Several other wetting agents have been used with success in this application. They are sulphonated ester of dicarboxylic acid, sold under the trade name of Aerosol OT; a long chain alcohol sulphate sold under the trade name of Dupanol W. A.; a sulphonated aromatic ether alcohol with the trade name of Triton W-30; and a higher secondary alcohol sulphate sold under the trade name of Tergitol #7.

The list of the above wetting agents is not intended to be exhaustive. Numerous other materials which appear on the market or are developed may be found suitable for the purpose. The effect and amount of these materials for satisfactory results may be readily determined by inspection of the base material.

A water suspension for applying graphite to fabric base materials, usually is most effective with from 0.5% to 2% of wetting agent by weight added to a given weight of water. An excess of wetting agent does not increase the effectiveness of the suspension. Experimentation will determine the amount of wetting agent required for best results. The fabric will show a thick, uniform and unstreaked coating of graphite with one of the better wetting agents in proper amount.

A satisfactory method of preparing this suspension is as follows: 1000 grams of water are heated to boiling and 40 grams of a dispersing agent, such as diglycol stearate, and approximately 10 grams of the wetting agent are added. After the wetting agent and dispersing agent have been thoroughly disseminated, 65 grams of 325 mesh graphite are added and stirred while cooling. The amount of graphite may be varied within wide limits, depending on the amount to be conveyed to the fabric. After being cooled, 8 ounce duck is dipped into the suspension, removed without allowing the material to stand in the suspension, and drained. The strip of duck is dried by heating, for example, in an oven at about 100° C. The fabric base material when properly treated will exhibit a well distributed coat of graphite without any streaks over its surface.

It has been found that in certain applications the wetting agent may be left out without greatly affecting the bearing as to bond strength. Apparently, the function of the wetting agent is to produce a more uniform coating of graphite on the fabric material. However, the dispersing agent alone will give a good graphitic impregnation of the fabric.

The graphite coated fabric base material may be then combined with a resinous binder or by using other well-known procedures of applying resin to a base material. A plurality of laminations of cloth are superimposed and subjected to heat and pressure in a properly shaped mold or die in order to obtain the bearing shape desired.

A second method of embodying graphite in Micarta composition bearings is by incorporation into the resin. Minerals when embodied directly in the resin employed in producing a bearing do not improve the wearing characteristics of the bearing unless they are properly wetted in mixing with the resinous binder. It is known that graphite will produce a weak laminated bearing when incorporated into resinous binders by simply mixing alone. The bearing tends to delaminate readily and has poor bond strength.

To secure good bond strength in laminated members prepared from resins containing graphite admixtures, it has been found that a dispersing agent is required. The methyl ester of abietic acid has been found to act as a dispersing agent for graphite in phenolic and other resins. A material of this kind is on the market under the trade name of Abalyn.

When the methyl ester of abietic acid and graphite are added to a resin, the graphite is deflocculated and is well distributed. A fabric base material may be satisfactorily impregnated with the graphitic resin. The resulting bearing will have a high bond strength.

For example, standard Micarta material without any graphite has a bond strength of 2770 pounds per inch for inch thick material, while graphite dispersed with the methyl ester of abietic acid, in at least one instance, has shown a bond strength of 2845 pounds per inch per inch thickness.

Various bearings are illustrated in Figs. 1, 2 and 3. In Fig. 1, there is a sectional view of a bearing 10 having a liner 18 made of the Micarta composition. The bearing illustrated comprises only a lower or supporting portion, but liners may be fabricated in other shapes up to a full 360°.

The bearing 10 includes a base 12 and two locating members 14 held in place by bolts 16. A bearing liner 18 is slipped into the base 12 and held in place by the bolts 16 and locating members 14. At either edge of the bearing are two chamfered grooves 20 for the introduction of water or other suitable lubricant. The bearing 18 is formed of a plurality of laminations of fabric material, carrying graphite and bonded together with resin under heat and pressure.

An alternative form of bearing is shown in Fig. 2, where a base 12 has a rectangular pocket for the reception of the composition bearing 22 having a bearing surface 24 for supporting a shaft or the like. The bearing has the chamfered grooves 20 for the introduction of water or other lubricant. The holding members 14 and the bolts 16 cooperate to hold and locate the bearing. The laminations in Fig. 1 generally are circumferential while the laminations of cloth in Fig. 2 may be horizontally disposed.

Fig. 3 shows a modification of the bearing wherein the bearing 26, having a surface 28 on which is supported a shaft or the like, is molded from chopped duck impregnated with graphite and mixed with a resinous binder, the whole being consolidated under heat and pressure.

The molding pressure for these bearings ranges from 1000 pounds per square inch and upward. The resinous material has a higher modulus of elasticity when molded at higher pressures. A suitable molding temperature for phenolic resins is 180° C.

Wear in a graphite "Micarta" or composition bearing may be considerably reduced by forming the bearing from a fabric base material impregnated with graphite from a suspension carrying graphite, a wetting agent, and a dispersing agent, and employing as the resinous binder a resin carrying from 10 to 30% of a wear resisting mineral. The minerals disclosed by Horne, et al. in the previously mentioned Patent No. 2,162,890, have been found satisfactory in this combination with graphite for this purpose. The minerals particularly adding to the wearing qualities are bentonite, whiting, rouge, rottenstone, aluminum oxide and talc. In particular, the mineral aluminum oxide, when incorporated in the resin, gives highly satisfactory composition bearings. The wear of a laminated composition bearing incorporating aluminum oxide in the resin and graphite, applied to the fabric from the water suspension above disclosed, is not appreciably greater than that of a bearing having aluminum oxide without graphite. Furthermore, the coefficient of friction of the bearing is considerably reduced by the use of graphite along with a resin composition carrying aluminum oxide.

Turning to Fig. 4 of the drawings, there is illustrated a graph plotting coefficient of friction against the load for several composition bearings. The various coefficient of friction values were determined and temperatures taken at the bearing after a period of running. The temperatures are significant in that seizure of the bearing occurs more readily at higher temperatures.

As will be noted, the standard bearing material has the highest coefficients of friction within the range of loads shown. The same general relation holds at loads up to 8000 pounds per square inch. Bearings incorporating mica disclose some improvement. Talc as added to the resin exhibits better results at low bearing pressures, but is less satisfactory in the higher bearing pressures. Graphite exhibits the lowest coefficients of friction throughout the entire range tested. The temperatures, furthermore, are lower for graphite bearings in all the tests. The graphite bearings not only are less liable to seize, due to overheating, but operate with less power loss.

Standard compositions have poor thermal conductivity. A composition commonly used in making bearings has a thermal conductivity of about .0059 watt per square inch per degree centigrade per inch. For laminated bearings the Micarta bearing embodying graphite has a thermal conductivity which is nearly three times as high: 0.015 watt per square inch per degree centigrade per inch. This enhanced thermal conductivity will assist in keeping the bearing cooler and tend to reduce the chances of seizure.

A graph showing the relation of coefficient of friction to peripheral velocities for several types of bearings at one load is shown in Fig. 5. The same general relationship holds for other loads. The #280 bearing comprises a standard heavy fabric Micarta loaded at 2000 pounds per square inch with water lubrication. The #271 bearing is made of Micarta including aluminum oxide as a wear resisting filler, and is loaded similarly to the #280 bearing. The #295 bearing is made of Micarta incorporating aluminum oxide in the resin and graphite upon the fabric in order to lower the coefficient of friction.

The dashed portion of the curve for a #295 Micarta bearing is within that region where this particular bearing has its most practical and desirable applications. The advantage in lower coefficient of friction secured by the #295 graphite carrying Micarta bearing over the other compositions is particularly great at velocities below 100 feet per minute, since the curves become asymptotic to the vertical, with greatly increased differences in coefficient of friction between points at the same peripheral velocity.

The bond strength of the Micarta made with graphite deposited upon the fabric base from a solution containing a wetting agent and a dispersing agent has been measured at 2880 pounds per square inch as against 2770 pounds per square inch for standard Micarta.

It will be seen that the bearing embodying graphite according to the invention is superior to bearing materials embodying talc or mica or other mineral in the resin. The graphite containing Micarta bearing material is especially suitable for bearings running at speeds less than 60 feet per minute peripheral speed. The starting torque of the bearings embodying graphite is such that they have been successfully used in installations, such as sugar cane mills, with peripheral speeds of 13 feet per minute, for which installations composition bearings have been heretofore considered unsatisfactory. The wear and bond strength are conducive to a long bearing life. Repairing and changing of bearings have been reduced to as little as one-fiftieth of that required in employing metal bearings.

Since certain changes may be made in the above product and article, and different embodiments of the invention can be made without departing from the scope thereof, it is intended that all matter contained in the above description or shown in the accompanying drawings shall be interpreted as illustrative and not in a limiting sense.

I claim as my invention:

1. A bearing material comprising, in combination, a base material, graphite for lowering the coefficient of friction of the bearing material, a dispersing agent composed of diglycol stearate and a wetting agent for effecting a good distribution and adherence of the graphite to the base material and a resin for consolidating the whole when subjected to heat and pressure.

2. A laminated bearing liner comprising, in combination, a plurality of laminations of a base material impregnated with graphite for lowering the coefficient of friction of the bearing liner, a dispersing agent composed of diglycol stearate and a wetting agent for effecting a good distribution and adhesion of the graphite to the base material and a resinuous binder applied to the base material for consolidating the impregnated laminations when the whole is subjected to heat and pressure.

3. A laminated bearing liner comprising, in combination, a plurality of laminations of a base material impregnated with graphite for lowering the coefficient of friction of the bearing liner, a dispersing agent composed of diglycol stearate and a wetting agent for effecting a good distribution and adhesion of the graphite to the base material, and a resinous binder carrying one or more of the group of minerals including bentonite, rouge, whiting, aluminum oxide, rottenstone and flint, the minerals being of a particle size small enough to facilitate mixing with the binder, the resin being applied to the base material for consolidating the impregnated laminations when the whole is subjected to heat and pressure.

4. A bearing material comprising, in combination, a fabric base impregnated with graphite, a dispersing agent comprising diglycol stearate, and a wetting agent carried by a liquid medium for effecting a good distribution on and adhesion of the graphite to the fabric base, and a resinous binder on the fabric base over the graphite for bonding the whole when subjected to heat and pressure.

5. A composition bearing comprising, in combination, a fabric base impregnated with graphite for lowering the coefficient of friction of the bearing, a dispersing agent composed of diglycol stearate and a wetting agent for effecting a good distribution on and adhesion of the graphite to the fabric base, and a resin for bonding the whole when subjected to heat and pressure.

6. A composition bearing comprising, in combination, a fabric base impregnated with graphite for lowering the coefficient of friction of the bearing, a dispersing agent composed of diglycol stearate and a wetting agent for effecting a good distribution on and adhesion of the graphite to the fabric base, and a resin carrying aluminum oxide to decrease wear in service for bonding the whole when subjected to heat and pressure.

7. A composition bearing comprising a base material impregnated with graphite for lowering the coefficient of friction of the bearing, a resinous binder for consolidating the whole when subjected to heat and pressure, and a wetting agent and a dispersing agent composed of diglycol stearate for effecting a good distribution and adhesion of the graphite in order that a predetermined bond strength may be secured in the consolidated bearing.

8. The method of incorporating graphite into a bonded composition bearing material for the purpose of reducing the coefficient of friction, while maintaining a suitable bond strength, which comprises applying to a base material a liquid medium carrying graphite, a wetting agent cooperating with the liquid medium to reduce the surface tension thereof, and a dispersing agent composed of diglycol stearate, the wetting agent and the dispersing agent cooperating to effect a good distribution and adhesion of the graphite on the base material, thereafter impregnating the base material carrying graphite with a resinous binder and consolidating the whole under heat and pressure.

9. The method of incorporating graphite into a bonded composition bearing material for the purpose of reducing the coefficient of friction, while maintaining a suitable bond strength, which comprises applying to a base material a liquid medium carrying graphite and a dispersing agent composed of diglycol stearate to secure a good distribution and adhesion of the graphite on the base material, thereafter impregnating the base material carrying graphite with a resinous binder and consolidating the whole under heat and pressure.

10. The method of incorporating graphite into a bonded composition bearing material for the purpose of reducing the coefficient of friction, while maintaining a suitable bond strength, which comprises applying to a base material a liquid medium carrying graphite, a wetting agent cooperating with the liquid medium to reduce the surface tension thereof, and a dispersing agent composed of diglycol stearate, the wetting agent and the dispersing agent cooperating to effect a good distribution and adhesion of the graphite on the base material, thereafter impregnating the base material carrying graphite with a resinous binder carrying one or more of the minerals selected from the group consisting of bentonite, rouge, whiting, aluminum oxide, rottenstone and flint, and consolidating the whole under heat and pressure.

11. A bearing material comprising, in combination, a base material impregnated with a resinous binder carrying graphite of a particle size small enough for mixing with the resinous binder for impregnating the base material, and a dispersing agent for effecting a good distribution of the graphite in the resinous binder while maintaining a predetermined bond strength, the dispersing agent being the methyl ester of abietic acid.

12. A bearing material comprising, in combination, a base material, graphite applied to the base material for lowering the coefficient of friction of the bearing material, a dispersing agent composed of diglycol stearate, and a wetting agent for effecting good distribution and adhesion of the graphite when applied to the base material, and a resin mixed with one or more of the group of minerals including bentonite, rouge, whiting, aluminum oxide, rottenstone and flint, the whole being consolidated under heat and pressure.

13. A bearing material comprising in combination, a base material, graphite for lowering the coefficient of friction of the bearing material, a dispersing agent composed of diglycol stearate, for the graphite to effect good distribution and bond strength, and a resinous binder for bonding the whole under heat and pressure.

ROBERT W. AUXIER.